United States Patent

[11] 3,601,652

| [72] | Inventor | Harry L. Burnett, Jr.<br>6904 Ingraham St., Riverdale, Md. 20840 |
|---|---|---|
| [21] | Appl. No. | 849,819 |
| [22] | Filed | Aug. 13, 1969 |
| [45] | Patented | Aug. 24, 1971 |

[54] SLAVE FLASH LIGHT
7 Claims, 1 Drawing Fig.

[52] U.S. Cl. .................................................. 315/156,
250/214 P, 315/241, 431/93
[51] Int. Cl. ................................................ H05b 37/02
[50] Field of Search ........................................... 250/214;
315/232, 241, 156; 431/92, 93, 95, 98

[56] References Cited
UNITED STATES PATENTS

| 2,509,967 | 5/1950 | Davis | 431/93 X |
| 2,546,734 | 3/1951 | Farber | 431/93 X |

Primary Examiner—Raymond F. Hossfeld
Attorneys—Franics D. Stephens and Hugo Huettig, Jr.

ABSTRACT: A slave flash device having a simplified circuitry triggered by light, which may, of course, include ultraviolet or infrared light waves from a distant source. The device including a battery and a resistance connected in series with parallel conducting means having a condenser in one branch and a silicon controlled rectifier and a flashbulb in the other branch, and including a photovoltaic cell means to trigger the silicon controlled rectifier.

PATENTED AUG 24 1971 3,601,652
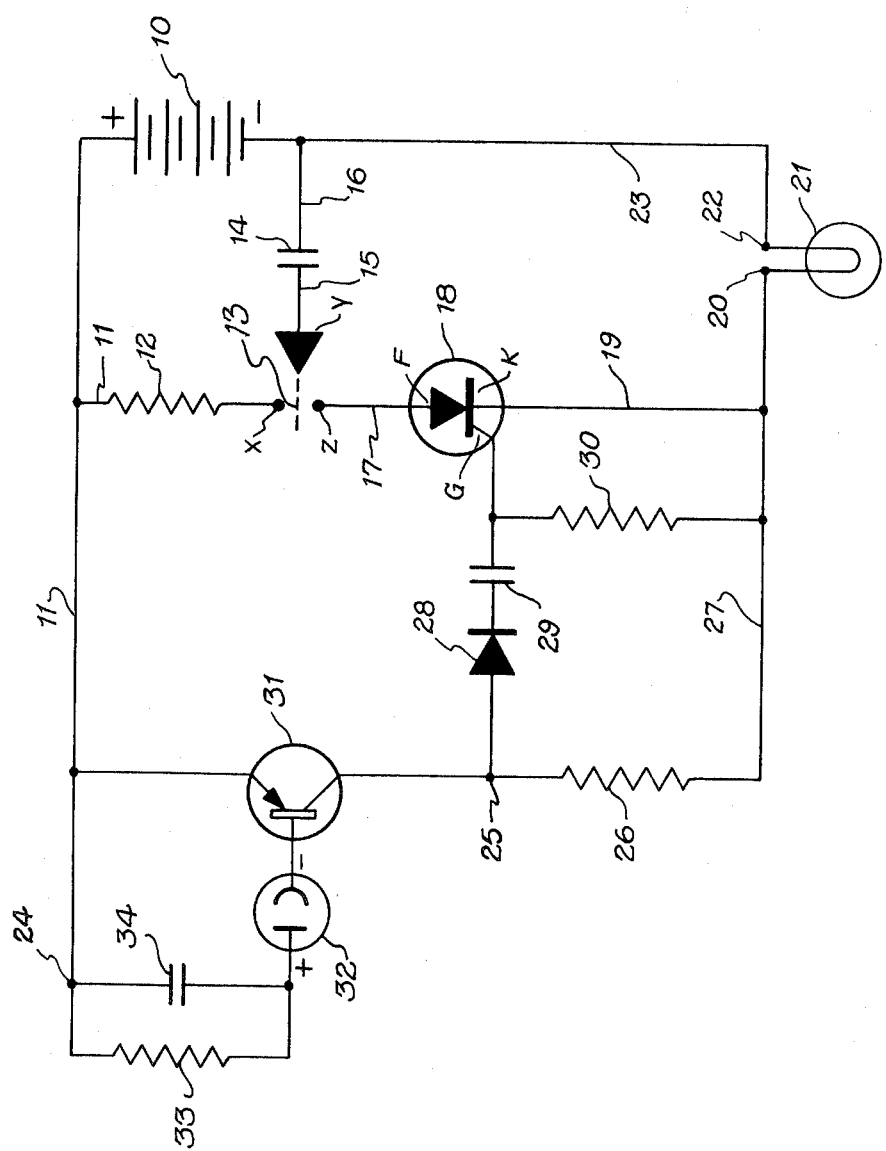
INVENTOR
*Harry L. Burnett, Jr.*

SLAVE FLASH LIGHT

A slave flash is a device to operate a flashlamp in synchronization for instance with camera shutter opening and closing, without direct interconnections between the camera and the device. One type uses a radio signal to activate the slave. A more common type of which the present invention is one, uses the light from a lamp synchronized with the camera shutter to activate the slave device. The main advantages of a slave flash is based on the avoidance of troublesome interconnecting wires, and it avoids the necessity of a shutter design including multiple outlets as any number of slave flashes may be activated by one master lamp. Further, they do not increase the load or energy demand from the camera master flash system. They are quick to set up and may be operated at great distances from the camera master system.

Recent trends toward increasing use of repetitive electronic flash units has brought to the market several excellent trigger circuits which will plug into these self contained units. Their high cost, weight, and bulk, however, have limited their wide use. The slave flash circuit design of the present invention fills a need for a modern slave flash unit using chemical flashlamps. It utilizes small solid state components to give dependability, good selectivity, high sensitivity, light weight, and low cost to attract wide acceptance.

The known chemical flashlamp slave units have many disadvantages and drawbacks so that they have not received wide acceptance.

It is an object of the present invention to eliminate the objectionable features of the known slave device by providing a small, inexpensive, light weight, humidity resisting device, using low voltage inexpensive batteries and having a long standby life.

If it a further objective to provide a slave circuit that can be put in place under widely varying light conditions including daylight and AC fluorescent lamps.

It is a still further object of the present invention to provide a slave circuit device omitting transformers and all but one battery and which including as it does standard solid-state electronic components is resistant to shocks and blows in transportation and use.

The circuit design of the present invention can be adapted to almost any case owing to the many common flashlamp bases and sizes, it offers opportunity for many varieties of case design, each equally good and using the same circuit.

Other and further objects and advantages will appear from the following specification accompanied by the accompanying drawing showing the preferred embodiment of the device in diagrammatic form. It will be noted that the connections between the several elements of the device are shown as being lines which may, of course, be direct connections not including wire but they may also be of wire as required to permit arrangement of the elements in any selected container.

In the drawing the positive terminal of a battery 10 of, for example, 15 volts, is connected through line 11 in series with a resister 12 which may be 10,000 ohms and to pole $x$ of a switch 13.

Pole $y$ of switch 13 connects in a series, a capacitor 14, of, for example, 180 microfarads through lines 15 and 16 to the negative side of battery 10.

Pole $z$ of switch 13 is connected through a line 17 to the anode F of a silicon controlled rectifier 18 or similar device, as for example a GE X–5 which functions as a gate.

Switch 13, in the open position, disconnects poles $x$, $y$, and $z$ from each other.

Switch 13 in the closed position, connects $x$, $y$, and $z$ to each other.

The cathode K, of rectifier 18, connects through a line 19 to contact 20 of a chemical flashlamp 21.

The electrical circuit between contacts 20 and 22 is completed through the normal igniter circuit within flashlamp 21.

The other contact 22, for flashlamp 21, is connected through line 23 to the negative terminal of battery 10. A connection at point 24 is made through line 11 to the positive terminal of battery 10. A point 25 is connected to point 24 through a PNP transister as will be described below. Point 25 is also connected to one terminal of a resistor 26, for example, 18,000 ohms. The other terminal of resistor 26 is connected to contact 20 through a line 27. Point 25 is also connected to the anode of a diode device 28, of, for example, a 1N261. The cathode of diode device 28 is connected to one terminal of a capacitor 29, as, for example, 2 microfarads. The other terminal of capacitor 29 is joined to gate G of rectifier 18 and to one terminal of resistor 30, of 4,300 ohms as an example. The other terminal of resistor 30 is connected to contact 20.

To describe one of many possibilities for the circuit between points 24 and 25, a simple example will be given using a minimum of parts. A single PNP transistor, a single photovoltaic cell (solar battery), one capacitor and one resistor are connected to perform the necessary functions.

This example should not be taken to limit the many possibilities for this portion of the total circuit. NPN transistor counterparts would require changes in polarities. Actual component values and multiple arrangements all could be varied and arrayed to make this portion of the circuit function as a light receiver which responds to variations in light intensity by varying (modulating) the electrical resistance between points 24 and 25.

A PNP transistor 31, as, for example, a 2N331 is connected between points 24 and 25, the emitter to 24 and the collector to 25. The negative terminal of a photovoltaic cell 32, is connected to the base of transistor 31. The positive terminal of photovoltaic cell 32 is connected to a resistor 33, of, for example, 180,000 ohms in parallel with a capacitor 34 to the emitter of transistor 31 via point 24.

A "line" in this specification is any low resistance electric conductor such as a copper wire or the like.

When the words "light" or "illumination" are used to describe circuit actuation herein, it also may include those wavelengths of electromagnetic radiations not in the visible region, but to which photovoltaic cell 32 is responsive. Ultraviolet or infrared wavelengths are examples.

A current sensitive device (such as a relay) may be substituted in place of the flashlamp 21 for certain uses and extends the use of this circuit to other fields.

OPERATION PROCEDURE

1. With switch in open or "Off" position, a good chemical flashlamp 21 is mounted to effect connection through its ignitor circuit contacts to contacts 20 and 22.
2. The flashlamp is positioned so it will illuminate the desired area while photovoltaic cell 32 faces the source of triggering light. The illumination may be received directly by the cell or indirectly as by reflection.
3. Switch 13 is closed or moved to "On" position.
4. When the triggering light source is made to operate and it illuminates the photovoltaic cell 32, so that flashlamp 21 will ignite within the time and intensity limitations of this device. The time-rise characteristics of chemical flashlamps and usual gaseous discharge flashlamps will both operate this circuit as shown in the example.
5. Switch 13 is opened and the spent flashlamp is removed. This may be done in reverse order.
6. If one decides not to use the flashlamp after completing operations 1, 2, and 3, the device may be disarmed without danger of accidental flashing by opening switch 13 before moving lamp 21.

OPERATION OF CIRCUIT

With switch 13 in open or "Off" position, insertion of lamp 21 energizes all circuits except those made through resistor 12, capacitor 14, and anode F of SCR 18. During the time interval after insertion of flashlamp 21, and closing of switch 13, photovoltaic cell 32 responds to the ambient light (or lack of it) and establishes through transistor 31 an electrical resistance. This may be a steady resistance or it may vary. This resistance in series with resistor 26 acting as a voltage divider provides a voltage at point 25 which may be steady or varying. This, of course, depends on the nature of the ambient light. Sun light or tungsten lamps produce a steady voltage while AC operated fluorescent lamps produce rising and falling voltages. Lack of illumination produces a steady voltage.

Diode 28 allows its connected plate of capacitor 29 to charge to almost the peak voltage provided at point 25. Voltage is held to near peak on this plate by the high reverse resistance of diode 28 during lower periods of varying voltage. The voltage on the diode connected plate of capacitor 29 will induce current flow into or out of the adjacent capacitor plate until steady conditions exist. This takes place in an extremely short time and always faster than switch 13 can be operated. Now switch 13 can be closed to energize the remaining circuits. Capacitor 14 is charged through resistor 12. As the voltage rises on capacitor 14, it also rises on anode F of SCR 18. This may take a second or two of time, but is usually not a drawback to its usefulness. Everything is now in readiness to receive the triggering light from the master flash. Should ambient light conditions change slowly during time between closing of switch 13 and triggering, the voltages will change slowly at point 25. However, either fast or slowly falling voltages cannot trigger SCR 18. A slowly rising voltage will slowly induce higher voltages across capacitor 29, but the currents and voltages to gate G of SCR 18 will "bleed off" almost as rapidly as they are induced and will not fire SCR 18.

Now if an increasing illumination is detected at 32 and if its rate of increase is rapid enough and the illumination increase was great enough and these were within the design limits of this device, the flashlamp will be ignited by the following series of events. The rapidly increasing illumination makes the stabilized voltage across capacitor 29 charge rapidly, inducing a voltage to the gate G of SCR 18 faster than it can be bled off, to cause SCR 18 to conduct freely. Capacitor 14 will discharge through SCR 18 and the resistance of lamp 21's ignitor filament will cause it to heat up and initiate the usual sequence of events to produce light. The burn apart of the ignitor filament opens all circuits except those through 12 and 14. Opening switch 13 completes the cycle. Capacitor 34 bypasses resistor 33 during changes of light intensity allowing peak intensities to be detected without decreasing the responses of transistor 31.

Resistor 12 acts as a current limiter to control current flow during initial stages of charging capacitor 14. It also keeps from shorting battery 10 while SCR 18 conducts and the low resistance ignition circuit of lamp 21 is still intact. Both actions protect and prolong the life of battery 10. Resistor 12 and capacitor 14 both prevent an extremely rapid voltage rise on the anode of SCR 18 and prevents spurious triggering. Battery 10 cannot directly ignite flashlamp 21 because current is limited by resistors to a value much below that required to begin heating the ignitor filament. This would be true even if a type of battery were used which could produce enough current. Capacitor 14 stores enough energy so that when this energy is released it will fire lamp 21 allowing use of a small, inexpensive battery.

Choice of capacitor values 29 and 34 controls the time rate reactions of this unit. Choice of diode type for component 28 and resistor 30 value controls the actual illumination increase necessary to trigger SCR 18, other components remaining constant in values. Amplification of the response of photovoltaic cell 32 is accomplished by transistor 31 and, as such, has a bearing on total increase of illumination necessary to trigger a unit.

The physical size of cell 32 influences the sensitivity of the device as it controls, to some degree, the light capturing ability of the unit. However, most photovoltaic cells of the same materials very in efficiency. These photovoltaic cells are sometimes called solar batteries.

Resistor 33 tends to reverse bias transistor 31 as well as bleed capacitor 34, it also alters the responses of photovoltaic cell 32.

Having now described the means by which the objects of this invention are obtained,

I claim:

1. A slave flash circuit comprising a battery having first and second poles, first conducting means leading from the first said pole of said battery to one contact of a flashbulb to be ignited, a second conducting means leading from the second pole of said battery through a first resistance, a disconnect switch, which is closed when the device is in use, and a silicon controlled rectifier having a gate connection being connected to the other contact of said flashbulb, and a conducting means including a first capacitance connecting said first conducting means to said second conducting means at said disconnect switch; triggering circuit means to activate said silicon controlled rectifier including light sensitive means, a diode and a second capacitance connected in series in that order connecting said second pole of said battery to, the said gate connection of said rectifier, said light sensitive means including a transistor so that, upon said light sensitive means being subjected to an increased illumination said transistor passes a surge of electricity by means of said diode and said capacitance to said gate connection of said silicon controlled rectifier to cause it to conduct current freely to ignite said flashbulb.

2. The slave flash circuit of claim 1 in which a connection is made between said light sensitive means and said second pole of said battery which connection includes a resistance and a capacitance in parallel.

3. The slave flash circuit of claim 1 in which an electrical circuitry including a resistance connects said triggering circuit means from a point between said light sensitive means and said diode to said other contact of said flashbulb.

4. The slave flash circuit of claim 3 including a further electrical circuitry including a resistance connecting said other contact of said flashbulb to said triggering circuit means between said capacitance and said gate connection.

5. The slave flash circuit of claim 1, having also an electrical connection including a resistance connecting from a point between said second capacitance and said gate connection to said other contact of said flashbulb.

6. The slave flash circuit of claim 1 in which said light sensitive means comprises a transistor in the triggering circuit means connecting said second pole of said battery to said gate connection of said rectifier, and a photovoltaic cell operatively connected to said transistor to activate said transistor upon said photovoltaic cell being subject to a sudden change of light intensity.

7. The slave flash circuit of claim 6 in which said photovoltaic cell is included in a circuit electrically connecting said second pole of said battery to said transistor, said circuit including a resistance and a capacitance in parallel, said resistance and capacitance being interposed in series with said photovoltaic cell between it and said second pole of said battery.